UNITED STATES PATENT OFFICE.

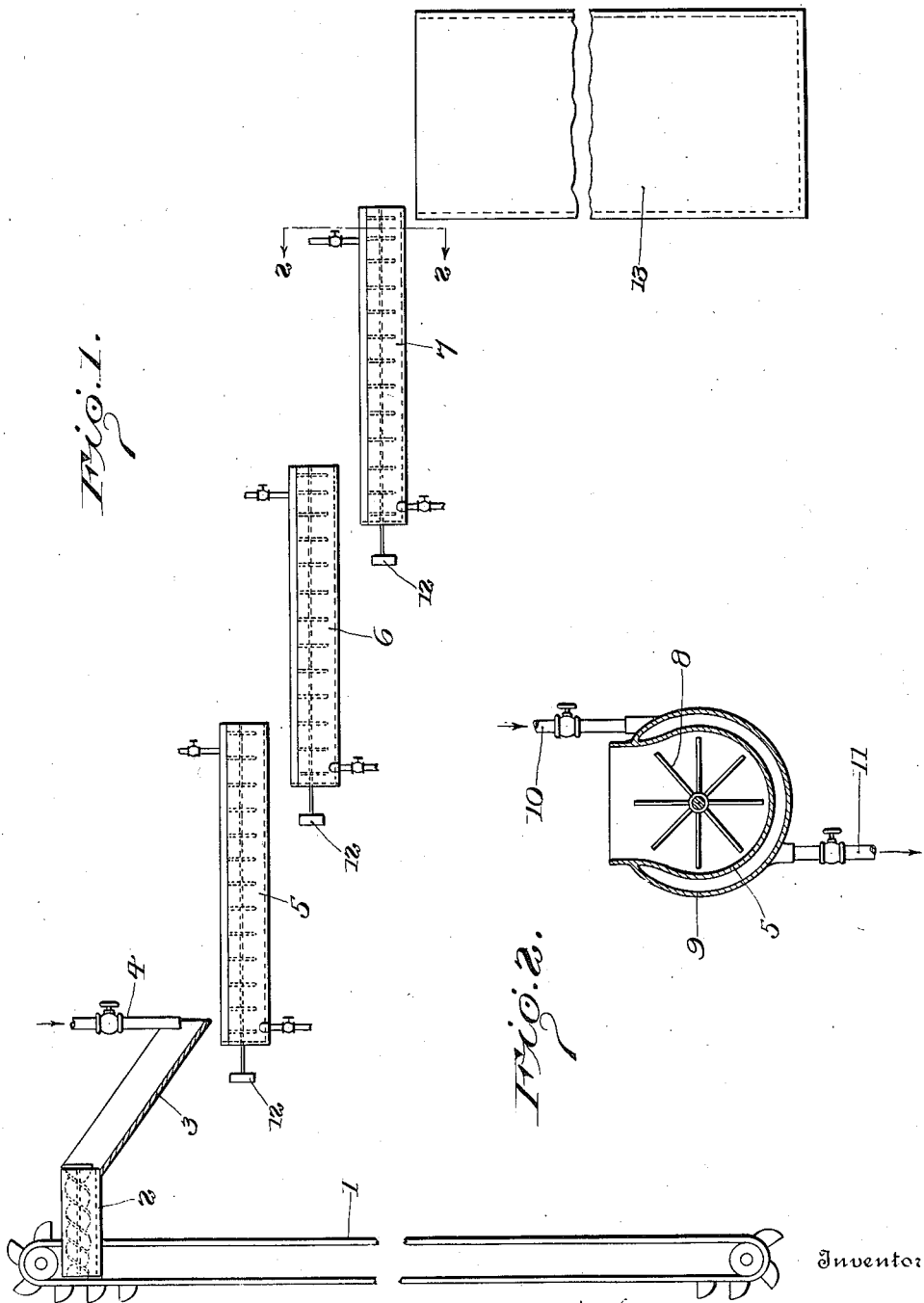

WILLIAM E. CARSON, OF RIVERTON, VIRGINIA.

PROCESS OF SLAKING LIME.

1,277,855. Specification of Letters Patent. Patented Sept. 3, 1918.

Application filed October 11, 1917. Serial No. 196,004.

*To all whom it may concern:*

Be it known that I, WILLIAM E. CARSON, a citizen of the United States, residing at Riverton, in the county of Warren and State of Virginia, have invented certain new and useful Improvements in Processes of Slaking Lime, of which the following is a specification.

This invention relates to processes of slaking lime, and it comprises a method of producing relatively coarse, dry slaked, pulverulent lime wherein lime is mixed with water in any usual manner, or in any usual device, the amount of water being merely sufficient to furnish the water required for chemical union with the lime and that evaporating in the operation without being sufficient to leave in the end a moist or wet product, and allowing slaking to proceed as usual with the accompanying rise of temperature, and retarding the slaking reaction when a predetermined point has been reached, by cooling the mass, all as more fully hereinafter set forth and as claimed.

In modern practice the demand for dry ready slaked limes adapted to form a mortar at once on admixture with water without waiting for slaking has become very great. Such a material is made by slaking quicklime with a limited amount of water; enough water to give at least a substantial amount of slaking but not enough to give a moist product. The dry slaked limes on the market however do not produce, as a rule, as plastic and "buttery" a mixture with water as do quicklimes of the same composition after slaking in the old fashioned manner; that is by adding plenty of water and allowing to stand. In the manufacture of dry ready slaked limes, necessarily the amount of water which can be used is, as stated, relatively limited; it is not ordinarily practical to make the mixture wet and afterward dry it; neither by so doing is there obtained a pulverulent material of the character wanted. Very many ways of producing dry dustless slaked lime have been described and a number are in use. Ordinarily the lime is moistened with about the amount of water chemically necessary for making the hydrated lime and with some additional water to compensate for evaporation losses; and is then allowed to heat up and slake.

I have found that the grain size of most of the ready slaked dry limes of commerce is too small; that a coarser grain size is desirable—a grain size comparable with that found in wet slaked lime. This relative coarseness of grain is useful for many purposes and is particularly desirable where a dry slaked lime is to be used as one of the materials in the process described and claimed in my Patent No. 1,239,256. In this patent I have described and claimed the manufacture of lime of high plasticity by mixing ready slaked limes of two different grain sizes. I find that it is desirable for this purpose to have one of the limes so to be mixed of a grain size which is coarser than that which is usual in commercial dry slaked lime. Such a coarse-grained material I produce in the present process.

When limestone is calcined, the quicklime which is left is a material of a very high degree of porosity. On wetting the water enters all these pores and chemical action begins practically at the same time throughout the lump or mass of lime. Heat is developed by this chemical action. The speed at which slaking takes place and the amount of heat which is developed depend of course upon the lime. High calcium limes slake quicker and develop more heat than magnesian limes. But in both, the penetration of the water into the pores is easy and quick. After it enters two actions can take place, the one being purely chemical and the other more of a physical nature. The first is of course the hydration. Calcium oxid is converted into calcium hydrate and to some extent, but usually rather imperfectly, magnesia is converted into its hydrate. The physical action depends on the presence of water as liquid and is usually described as solution and redeposition of lime in such manner as to cause the particles to grow or increase in size. With a high calcium lime slaked to form dry hydrate very little of the latter action occurs since the water not going at once into combination is rapidly driven off as steam. With a slower slaking lime, more of this action occurs since even if the amount of water be small, time is afforded for the liquid to act. I attribute the varying size of grain in various brands of commercial dry ready slaked limes to a difference in the slaking action of this character. In all cases however the grain size is finer than that produced in the present invention. In the older way of making mortar, after the lime particle is hydrated it lies in an excess of water for a time and there is opportunity for the stated solution and redeposition or crystallization to occur; with the result of producing a, comparatively speaking, coarse grained lime.

In the present invention it is my object to combine the advantages of both methods; the relatively large grain size of the old wet slaking methods and the production of the dry hydrate of the newer methods. To this end, I mix lime and water and operate in the usual manner, up to a certain point, employing only the amount of water which will combine and be evaporated in the course of the process. When this point is attained, which is prior to the maximum development of heat in the slaking, I interrupt the slaking by cooling, the cooling being usually quite sudden. At this stage the lime is not completely hydrated and there is still liquid water present. This liquid water will remain for a longer time than if the chilling had not been effected. The slaking action proper is much slowed down by the chilling. During the time of the presence of the liquid water it can exercise not only its hydrating power but also the grain increasing power of the excess of water in the ordinary wet slaking method. After the chilling, slaking, that is hydration, goes on as before but it is slower and during the time required the grain is given an opportunity to coarsen. I can obtain a variety of different sizes of grain in the same lime by variations in the process as just described. For if I allow the slaking to go forward relatively long before the chilling, there will be relatively little liquid water left but there will be some—enough to produce an effect. In this event I can make a highly plastic lime since I produce some fine grained ordinary dry slaked lime intermixed with the relatively coarser grain formed by the small amount of residual water present. By chilling earlier, I produce a relatively coarse grained material; a material which is eminently adapted for admixture with ordinary dry slaked lime to give the highly plastic mixture of my Patent No. 1,239,256.

The exact temperature and time at which I chill varies with the different limes. With the high calcium lime, I may, for example, allow the temperature to reach about 60° C. and then cool. With a lime less rich in calcium it is often desirable to allow the temperature to go further, even as high as 100° C.

The cooling may be in any desired way. The slaked lime may, for example, be run through a water cooled conduit, such as a jacketed screw conveyer. Or the lime may be spread out in an open textured layer to allow quick evaporation to cool it. The exact manner in which the cooling is effected may be varied indefinitely.

In the accompanying illustration I have shown more or less diagrammatically, certain apparatus adapted for use in the described process. In this showing—

Figure 1 is a view partly in elevation and partly in section of an apparatus adapted for slaking lime; and Fig. 2 is a transverse vertical section on the various lines 2—2 of Fig. 1.

In this showing, element 1 is a conveyer taking ground lime to conveyer 2 whence it is delivered into chute 3. The desired amount of water is added at 4 and the mixture of water and lime sent forward through mixing conveyer 5. In this conveyer the temperature is allowed to rise to a predetermined point of 60° C., 100° C., 120° C., etc. From this mixing conveyer, the lime is taken to mixing conveyer 6 where the temperature may be reduced by the aid of a water jacket; this reduction in temperature being to say 20 to 30° C. below the the temperature attained in the first mixing. From this mixing device it is again sent to jacketed mixing device 7 where the temperature may be allowed to rise again somewhat or may be maintained at the temperature attained in 6. As shown in Fig. 2, the mixing devices 5, 6 and 7 are provided with internal rotatable blades 8, and a jacket 9 supplied with cooling (or heating fluid) through 10. Valved pipe 11 allows withdrawal of the heating fluid. Motion is afforded to the bladed elements in the various mixers by pulleys 12. The lime coming from the last of the mixers shown is deposited in 13 to complete its slaking.

Taking a lime carrying about 85 per cent. calcium oxid and 15 per cent. magnesia in order to obtain an advantageous type of hydrate it may first be pulverized to a fine mesh and then mixed with about 60 per cent. of its weight of water. Hydration at once begins and continues until steam is freely evolved, the temperature at this time being at or about 100° C. Before hydration is complete and while steam is still coming off copiously the mass is chilled; which may be done in such an apparatus as above illustrated. Chilling is continued until the evolution of steam stops and the temperature of the mass drops to, say, 80° C. This usually takes 10 to 15 minutes for a mass of any suitable size. The chilled mass may then be dumped into a tank to allow hydration to continue to completion at a temperature below 100° C.

While I have hereinbefore described the present operation as effected with the use of ordinary water in slaking, I have found that by addition of minute quantities of various materials to the water the effects here desired may, in some cases be varied. As a matter of fact even the difference between various kinds of water often makes a difference in the size of grain. Where various chemicals capable of acting upon quicklime are present at the time of slaking, being added with the slaking water or prior thereto, there are formed, even when such chemicals are present in the minutest quantity small amounts of corresponding products, and the presence of these products in the slaked lime often materially affects its plasticity. Among the various reagents which I have found useful additions to the slaking water may be mentioned sulfuric acid, hydrochloric acid, acetic acid, caustic soda, gypsum, salt, etc. The amount of these additions is in all cases small and it may be very small. For instance, in using sulfuric acid the amount added is often so small as 0.05 per cent. of sulfuric acid calculated on the amount of lime hydrated. The addition of these various reagents materially alters the speed of hydration, thereby forming a varying grain size in the hydrate. By using small amounts of these reagents, in the slaking process hereinbefore described, the result of a varying grain size is easily accomplished and the relative differences in grain size are somewhat different from those attained with the same water but without the addition of the reagent. The general tendency of these reagents however is to produce a coarser grain size and where they are employed, as a rule I use them to make a lime containing a relatively large proportion of relatively coarse grained material. Such a relatively coarse grained material is particularly adapted for mixing with fine grained commercial limes under the process of my Patent No. 1,239,256.

What I claim is:—

1. The process of slaking lime which comprises mixing lime and water, the amount being substantially only that necessary for hydration and evaporation, allowing the chemical action to go forward for a time, and then suddenly chilling to a lower temperature.

2. The process of slaking lime which comprises mixing lime and water, the amount being substantially only that necessary for hydration and evaporation, allowing the chemical action to go forward until the mixture becomes warm, and then chilling before the maximum temperature is reached.

3. The process of slaking lime which comprises mixing lime and water, the amount being that necessary to produce a dry hydrated lime, allowing the chemical action to go forward till a predetermined temperature has been attained, and then chilling, and thereafter completing the chemical action at a lower temperature.

4. The process of slaking lime which comprises mixing lime with water and a minute quantity of a chemical reagent, the amount of water being substantially only that necessary for hydration and evaporation, allowing the slaking to go forward for a time and then suddenly chilling to a lower temperature.

5. The process of slaking lime which comprises mixing lime with water and a minute quantity of a chemical reagent, the amount of water being substantially only that necessary for hydration and evaporation, allowing the slaking to go forward until the mixture becomes warm and chilling before the maximum temperature is reached.

In testimony whereof, I affix my signature hereto.

WILLIAM E. CARSON.